United States Patent
Anvekar et al.

(10) Patent No.: US 9,893,877 B2
(45) Date of Patent: Feb. 13, 2018

(54) CIRCUITS, SYSTEMS, AND METHODS FOR SYNCHRONIZATION OF SAMPLING AND SAMPLE RATE SETTING

(71) Applicant: Analog Devices Global, Hamilton (BM)

(72) Inventors: Mayur Gurunath Anvekar, Bangalore (IN); Venkata Aruna Srikanth Nittala, Bengaluru (IN); Roberto Sergio Matteo Maurino, Turin (IT); Naiqian Ren, Limerick (IE)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/336,414

(22) Filed: Oct. 27, 2016

(65) Prior Publication Data

US 2017/0207907 A1    Jul. 20, 2017

(51) Int. Cl.
*H04L 7/00* (2006.01)
*H04L 7/033* (2006.01)
*H04L 12/24* (2006.01)

(52) U.S. Cl.
CPC .......... *H04L 7/0331* (2013.01); *H04L 7/0012* (2013.01); *H04L 41/0896* (2013.01)

(58) Field of Classification Search
CPC . H04L 7/0331; H04L 41/0896; H04L 7/0012; H04L 7/005; H04L 7/007; H03L 7/0992; H03L 7/0814
USPC ................................ 375/355, 356, 371, 373
See application file for complete search history.

(56) References Cited

U.S. PATENT DOCUMENTS

| | | | |
|---|---|---|---|
| 4,833,474 A | 5/1989 | Nagai et al. | |
| 5,379,323 A * | 1/1995 | Nakaya | H04L 7/007 329/304 |
| 5,491,713 A * | 2/1996 | Kwok | H04L 7/0331 329/304 |
| 5,790,615 A * | 8/1998 | Beale | H03L 7/0992 370/208 |
| 5,892,468 A | 4/1999 | Wilson et al. | |
| 6,128,357 A * | 10/2000 | Lu | H04L 7/0029 329/325 |

(Continued)

FOREIGN PATENT DOCUMENTS

| | | |
|---|---|---|
| CN | 203057123 U | 7/2013 |
| JP | 2009-300128 A | 12/2009 |

*Primary Examiner* — Phuong Phu
(74) *Attorney, Agent, or Firm* — Schwegman Lundberg & Woessner, P.A.

(57) ABSTRACT

Techniques for synchronization between multiple sampling circuits using a single pin interface to control an output data rate are described. The frequency or rate of a signal on this pin can be automatically determined and used to accomplish the required output data rate. Also described are techniques for using a single pin interface that can allow a sampling device to operate either in a master mode that can generate data strobes, or in a slave mode that can receive a convert start signal. Also described are techniques for controlling bandwidth and throughput for individual channels in a multi-channel device using a single pin interface. For example, using various techniques of this disclosure, integer multiple rate control for other channels can be provided thereby providing varying ODR for different channels, which can also control the bandwidth of interest.

20 Claims, 4 Drawing Sheets

(56) References Cited

U.S. PATENT DOCUMENTS

| | | | |
|---|---|---|---|
| 6,850,580 B1 | 2/2005 | Naoe | |
| 7,483,506 B2 * | 1/2009 | Yajima | H03L 7/0814 370/509 |
| 9,123,408 B2 * | 9/2015 | Jose | G11C 7/222 |
| 2012/0303994 A1 * | 11/2012 | Bauernfeind | H04L 7/005 713/400 |
| 2012/0303996 A1 * | 11/2012 | Bauernfeind | H04L 7/0012 713/503 |

* cited by examiner

CIRCUITS, SYSTEMS, AND METHODS FOR SYNCHRONIZATION OF SAMPLING AND SAMPLE RATE SETTING

CLAIM OF PRIORITY

This application claims the benefit of priority of U.S. Provisional Patent Application Ser. No. 62/279,282, titled "CIRCUITS, SYSTEMS, AND METHODS FOR SYNCHRONIZATION OF SAMPLING AND SAMPLE RATE SETTING" to Mayur Gurunath Anvekar et al. and filed on Jan. 15, 2016, which is herein incorporated by reference in its entirety.

TECHNICAL FIELD

This disclosure relates generally to data sampling techniques and, more particularly, to synchronizing a plurality of sampling channels.

BACKGROUND

Some applications require sampling of related analog signals by multiple devices. Typically, the sampling must be synchronized between the devices for the data output by the devices to be useful. For example, in sonar applications, sound waves transmitted or received may be sampled by multiple devices. For calculation of time of flight information from the sampled signals to be accurate, the sampling must be synchronized. Many sampling applications also require the ability to set a specific output sample rate of the sampled signal, which may be different from and/or asynchronous with a clock frequency used to sample.

Problems can arise, however, when attempting to synchronize sampling at multiple devices and set specific output sample rates at these devices. Attempting to synchronize provision of a sampling clock signal to each of the devices can incur significant board design overhead, as the clock signal routing to each device must be carefully matched. Using one device as a master and providing its clock to other devices can similarly require careful clock signal routing to each of the other devices as well as compensation of the sampling edges between the master and slave devices.

SUMMARY

Techniques for synchronization between multiple sampling circuits using a single pin interface to control an output data rate are described. The frequency or rate of a signal on this pin can be automatically determined and used to accomplish the required output data rate. Also described are techniques for using a single pin interface that can allow a sampling device to operate either in a master mode that can generate data strobes, or in a slave mode that can receive a convert start signal. Also described are techniques for controlling bandwidth and throughput for individual channels in a multi-channel device using a single pin interface. For example, using various techniques of this disclosure, integer multiple rate control for other channels can be provided thereby providing varying ODR for different channels, which can also control the bandwidth of interest.

In some examples, this disclosure is directed to a system for synchronizing a plurality of sampling channels. The system comprises a single output data rate (ODR) terminal configured to receive a desired ODR signal representing an ODR, a synchronization circuit configured to receive the desired ODR signal and a first clock signal and output a second clock signal synchronized to the ODR signal and output a data signal representing a relationship of the ODR to a frequency of the first clock signal, and at least one of the plurality of sampling channels. The at least one of the plurality of sampling channels includes a sampling circuit configured to receive a respective analog input signal and the first clock signal and output a sampled signal based on the analog input signal at a rate based on the frequency of the first clock signal, and a rate setting circuit configured to receive the data signal and the second clock signal and output a digital signal representative of the respective analog input signal at the output data rate.

In some examples, this disclosure is directed to a system for synchronizing a plurality of sampling channels. The system comprises means for receiving a desired ODR signal representing an ODR, means for receiving the desired ODR signal and a first clock signal, means for outputting a second clock signal synchronized to the ODR signal and outputting a data signal representing a relationship of the ODR to a frequency of the first clock signal, means for receiving a respective analog input signal and the first clock signal and outputting a sampled signal based on the analog input signal at a rate based on the frequency of the first clock signal, and means for receiving the data signal and the second clock signal and outputting a digital signal representative of the respective analog input signal at the output data rate.

In some examples, this disclosure is directed to a method for synchronizing a plurality of sampling channels. The method comprises receiving, via a single output data rate (ODR) terminal, a desired ODR signal representing an ODR, receiving, via a synchronization circuit, the desired ODR signal and a first clock signal, outputting, via the synchronization circuit, a second clock signal synchronized to the ODR signal and outputting a data signal representing a relationship of the ODR to a frequency of the first clock signal, receiving, via a sampling circuit, a respective analog input signal and the first clock signal and outputting a sampled signal based on the analog input signal at a rate based on the frequency of the first clock signal, and receiving, via a rate setting circuit, the data signal and the second clock signal and outputting a digital signal representative of the respective analog input signal at the output data rate.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As mentioned above, problems can arise when attempting to synchronize sampling at multiple devices and set specific output sample rates at these devices. Attempting to synchronize provision of a sampling clock signal to each of the devices can incur significant board design overhead, as the clock signal routing to each device must be carefully matched. Therefore, a need exists for circuits, systems and methods for synchronizing sampling and sample rate setting at multiple devices without incurring the overhead of an accompanying complex inter-device board design.

This disclosure describes techniques for synchronization between multiple sampling circuits using a single pin interface to control an output data rate. Using various techniques described below, the frequency or rate of a signal on this pin can be automatically determined and used to accomplish the required output data rate.

Also described are techniques for using a single pin interface that can allow a sampling device to operate either in a master mode, e.g., as a sigma delta analog to digital converter (ADC), that can generate data strobes, or in a slave mode, e.g., as a successive approximation register (SAR) ADC, that can receive a convert start signal.

Also described are techniques for controlling bandwidth and throughput for individual channels in a multi-channel device using a single pin interface. For example, using various techniques of this disclosure, integer multiple rate control for other channels can be provided, e.g., output data rate (ODR)/2, (ODR)/4, etc., thereby providing varying ODR for different channels, which can also control the bandwidth of interest.

Figure 1:
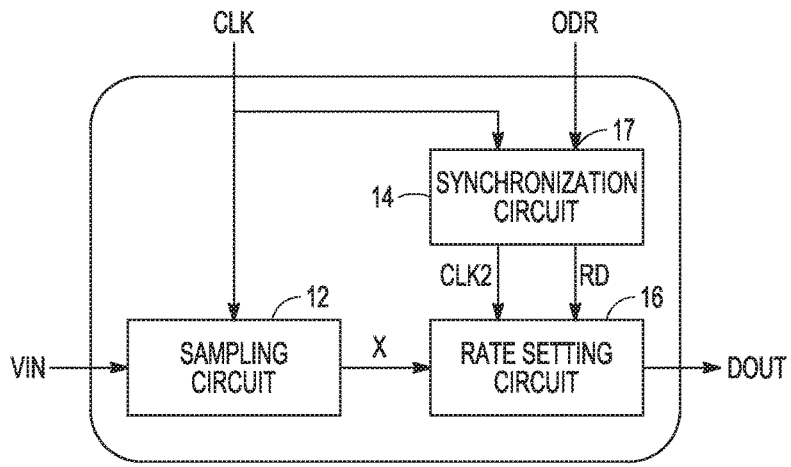
FIG. 1 depicts an embodiment of a sampling device to provide improved synchronization of sampling and sample rate setting.

FIG. 1 depicts an embodiment of a sampling device 10 to provide improved synchronization of sampling and sample rate setting. The sampling device 10 may include a sampling circuit 12, a synchronization circuit 14, and a rate setting circuit 16.

The sampling circuit 12 may receive an analog input signal VIN and a clock signal CLK, and output a sampled signal X based on the analog input signal VIN at a rate based on a frequency of the clock signal. The sampling circuit 12 may be a circuit that performs sampling as part of analog-to-digital conversion, data modulation, etc. For example, the sampling circuit 12 may be an analog to digital converter (ADC) that receives the analog input signal VIN, and samples and converts the analog input signal to a corresponding digital signal DOUT at a certain sample rate as the sampled signal. In another embodiment, the sampling circuit 12 may be a modulator circuit, such as a sigma delta modulator, that receives the analog input signal VIN, and samples and modulates the analog input signal to generate a corresponding modulated signal at a certain modulation rate as the sampled signal.

As mentioned above, when multiple devices are used in a system to sample data at the same point and stream the digitized data, the devices should be synchronized so as to define a common start point for every device and the data received. However, in such scenarios, it can be a challenge to synchronize different devices operating at their own system clock.

This disclosure describes techniques for synchronization between multiple sampling circuits using a single pin interface to control an output data rate. Using various techniques described below, the frequency or rate of a signal on this pin can be automatically determined and used to accomplish the required output data rate.

Advantageously, board routing can be simplified using these techniques. Board routing is much easier for slower signals. Because the ODR is usually lower than the rate of the sampling clock, these techniques can aid board routing.

In accordance with this disclosure, the synchronization circuit 14 may include a single pin interface, namely single ODR terminal 17, to control an output data rate. The frequency or rate of the signal on single ODR terminal 17 can determine the required output data rate. For example, a frequency detector, e.g., a digital phase locked loop and a ratio calculator, can automatically determine the desired output data rate from the incoming signal on the ODR terminal 17. In some example implementations, once the output data rate is determined, an integer or fractional decimation chain can perform the rate conversion.

The single ODR terminal 17 is configured to receive a desired ODR signal representing an ODR. The synchronization circuit 14 may receive the clock signal CLK and the desired ODR signal, and provide a second synchronized clock signal CLK2 and data signal RD indicative of the ratio of the ODR to the first clock signal frequency CLK. In other words, the synchronization circuit 14 is configured to receive the desired ODR signal and a first clock signal CLK, output a second clock signal CLK2 synchronized to the ODR signal, and output a data signal RD representing a relationship of the ODR to a frequency of the first clock signal CLK. In some examples, the frequency of the first clock signal is higher than a frequency of the second clock signal and a frequency of the ODR.

Figure 4:
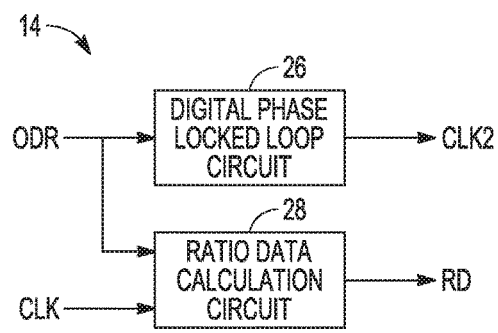
FIG. 4 depicts an embodiment of a synchronization circuit.

In some example configurations, the synchronization circuit 14 may include a digital phase locked loop (PLL) circuit, e.g., digital PLL circuit 26 of FIG. 4, and a ratio data calculation circuit, e.g., ratio data calculation circuit 28 of FIG. 4. The received output data rate may take the form of a clock signal at the desired output data rate. The digital phase locked loop circuit may receive the output data rate signal and generate a clock signal CLK2 synchronized to the output data rate signal. The synchronized clock signal may thus be independent of any jitter present in the output data rate signal.

Using a digital phase locked loop can provide several benefits. For example, jitter on the output data rate pin is of little or no concern to performance, thereby relaxing any constraints on board routing. In addition, jitter on the sampling clock is of little or no concern to the final performance.

The ratio data calculation circuit may receive the desired output data rate and the clock signal CLK and calculate the ratio data RD. The ratio data may be of a nature corresponding to data required by embodiments of the rate setting circuit 16. For example, the ratio data may include one or more of filter coefficients, intersample position parameter, etc., required to set the output rate relative to the rate of the first clock signal to implement output data rate setting operations such as interpolation, decimation, etc.

The rate setting circuit 16 may receive the sampled signal X, the second clock signal CLK2, and the data signal representing a relationship of the ODR to a frequency of the first clock signal, e.g., ratio data RD, and provide a digital output DOUT at the output data rate. In some embodiments, the sampling circuit 12 and rate setting circuit 16 may together be components in an analog to digital conversion signal chain, such as a sigma delta modulator and a decimation circuit, respectively. In other embodiments, the sample rate setting circuit 16 may set the sample rate independently of operation of the sampling circuit 12. For example, the sample rate setting circuit 16 may be a sample rate converter that may receive a first digital signal at a first sample rate and provide a second digital signal at a second sample rate.

Figure 2:
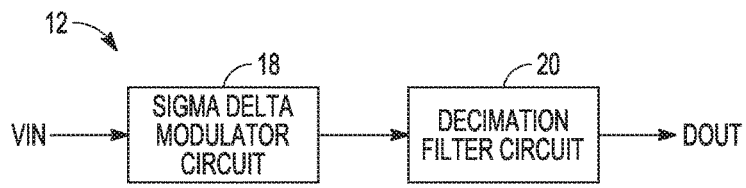
FIG. 2 depicts an embodiment of a sampling circuit in which the sampling circuit includes a sigma delta ADC having a sigma delta modulator and a decimation filter.

FIG. 2 depicts an embodiment of the sampling circuit 12 in which the sampling circuit may include a sigma delta ADC having a sigma delta modulator 18 and a decimation filter 20. As discussed above, in other embodiments, the sampling circuit 12 may include the sigma delta modulator 18 of FIG. 2, but not necessarily the decimation circuit 20. In some embodiments, the sigma delta ADC and/or sigma delta modulator may be an oversampling sigma delta ADC and/or oversampling sigma delta modulator. The sampling circuit 12 also may include other types of ADCs, such as a successive approximation (SAR) ADC, a pipeline ADC, a flash ADC, etc., or other types of modulators.

Figure 3:
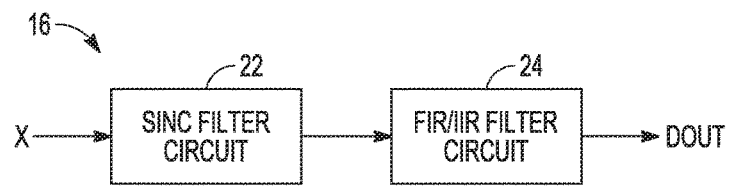
FIG. 3 depicts an embodiment of a rate setting circuit in which the rate includes a decimation circuit having a sine filter and a finite impulse response or infinite impulse response filter.

FIG. 3 depicts an embodiment of the rate setting circuit 16 in which the rate setting circuit may include a decimation circuit having one or more filters such as a sine filter 22 and a finite impulse response (FIR) or infinite impulse response (IIR) filter 24. In some embodiments, the sampling circuit 12 and the rate setting circuit 16 may together form a sigma delta ADC, such as depicted in FIG. 2, with the sampling circuit 12 including the sigma delta modulator 18 and the rate setting circuit 16 including the decimation filter 20.

FIG. 4 depicts an embodiment of the synchronization circuit 14. As discussed above, the synchronization circuit 14 may include a digital phase locked loop circuit 26 and a ratio data calculation circuit 28. In general, the digital phase locked loop circuit 26 and ratio data calculation circuit 28 are responsible for determining the decimation ratio and providing the ratio to the decimation chain, e.g., the rate setting circuit 16 of FIG. 3.

The sampling device 10 of FIG. 1 may provide improved synchronization of sampling and sample rate setting among a plurality of sampling channels, as described below with respect to FIG. 5 for example.

Figure 5:
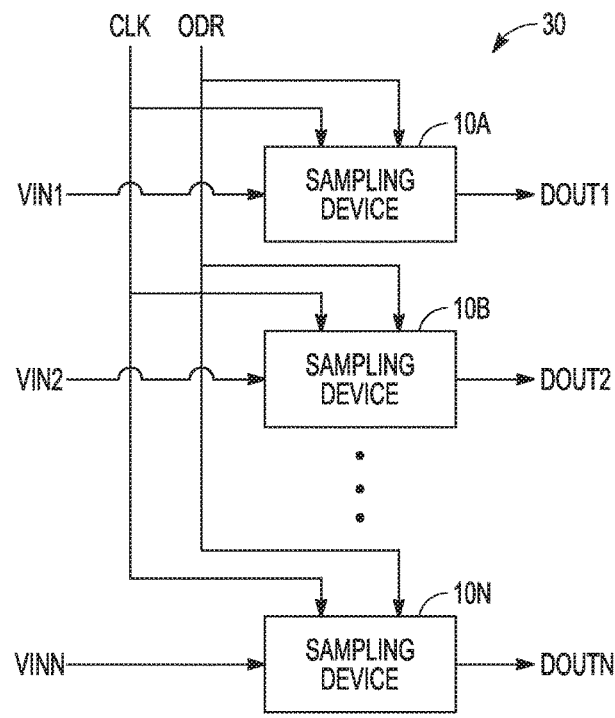
FIG. 5 depicts an embodiment of a sampling and rate setting system.

FIG. 5 depicts an embodiment of a sampling and rate setting system 30 for synchronizing a plurality of sampling channels. The system 30 may include at least one of the plurality of sampling channels, e.g., at least one of the plurality of the sampling devices 10 of FIG. 1, depicted as sampling devices 10A-10N in FIG. 5 (referred to collectively as "sampling devices 10").

Each of the sampling devices 10A-10N may receive a respective analog input signal VIN1-VINN, clock signal and output data rate signal, and provide a corresponding digital output signal DOUT1-DOUTN. The sampling and rate setting system 30 may provide improved synchronization by eliminating the need for complex and accurate clock signal routing on a board containing the system, as the sampling devices 10 may each provide a digital output synchronized and with a rate set according to the ODR signal. In other embodiments, the sampling devices 10 may each receive a different analog input signal and/or a different output data rate signal.

In some example configurations, the plurality of sampling channels, e.g., a plurality of the sampling devices 10A-10N, are located in a plurality of sampling devices. In some example configurations, the plurality of sampling devices are located on the same circuit board.

As indicated above, the sampling circuits 12 may include sigma delta ADCs, as well as other types of ADCs, such as a successive approximation (SAR) ADC, a pipeline ADC, a flash ADC, etc., or other types of modulators. A SAR ADC interface can operate on the principle of providing a "Convert Start" signal to the analog sampling circuit directly. In a SAR ADC, the input data can be directly sampled at the Convert Start rate and also using a faster data clock. The post processed data can then be transmitted at the same rate as the Convert Start signal. The device operates in a slave mode and responds to the Convert Start when requested.

In a sigma delta ADC, the input can be oversampled and, unlike the SAR ADC, the input signal is not sampled at the Nyquist rate but usually sampled by a large oversampling ratio. In sigma delta ADC interfaces, the output data rate can be set via register writes and the device can generate output strobes at the requested rate along with the data. The sigma delta ADC device acts as a master, where the data strobes are generated by the device, as compared to the SAR ADC device, which operates as a slave.

This disclosure describes techniques for using a single pin interface that can allow a sampling device to operate either in a master mode, e.g., as a sigma delta ADC, that can generate data strobes, or in a slave mode, e.g., as a successive approximation register (SAR) ADC, that can receive a convert start signal. Using these techniques, a SAR ADC interface and sigma delta ADC interface, for example, can be combined into a single interface. An example implementation is depicted in FIG. 6 and described below.

Figure 6:
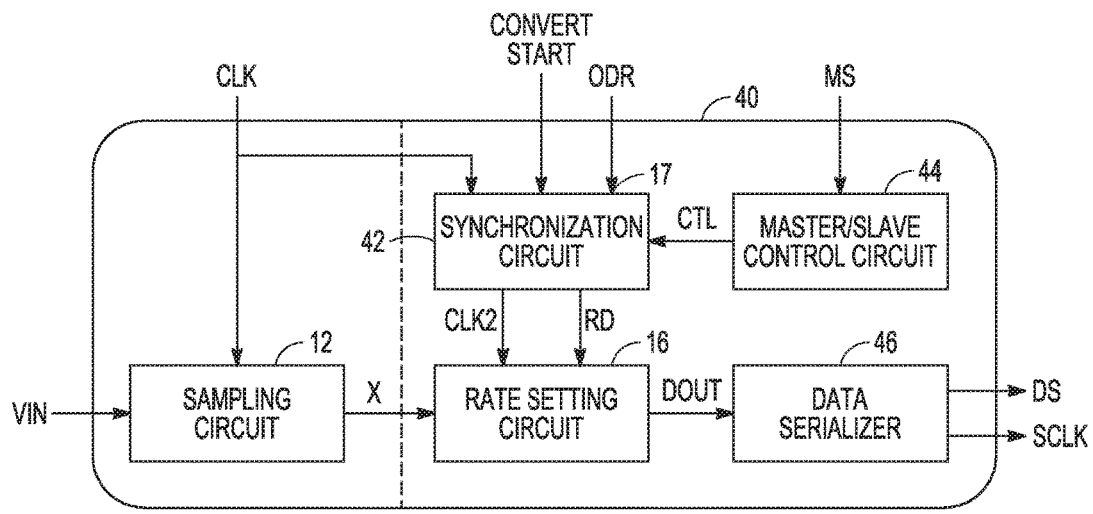
FIG. 6 depicts an embodiment of a sampling device configured to provide master and slave mode operation.

FIG. 6 depicts an embodiment of a sampling device configured to provide master and slave mode operation. The sampling device 40 may include a sampling circuit 12, a synchronization circuit 42, a rate setting circuit 16, and a master/slave control circuit 44. The sampling circuit 12 and rate setting circuit 16 may be configured to operate as discussed above in regard to the embodiment of FIG. 1. The synchronization circuit 42 can include components similar to the synchronization circuit 14 of FIG. 4.

The synchronization circuit 42 may be configured to operate in either a master mode or slave mode. The synchronization circuit 42 may include a single bidirectional ODR terminal 17 configured to receive a desired ODR signal representing an ODR when operation in a slave mode and output a clock signal when operating in a master mode.

A slave mode can be achieved when the single pin interface, e.g., single pin ODR terminal 17, acts as an input. When provided to the system, the Convert Start signal and desired ODR signal can be input into the synchronization circuit 42, which can determine the required rate conversion. Generally, the rate conversion can be such that the output rate can be less than the input sampling data rate.

When a master mode operation is desired, the user can input the desired ODR or decimation directly, e.g., via an available register interface (not depicted). Using the decimation input, the synchronization circuit 42 can generate and output clock signals or strobes at the requested rate on the single pin interface 17, e.g., on bidirectional single pin ODR terminal 17.

The synchronization circuit 42 may include a digital phase locked loop circuit and a ratio data calculation circuit, e.g., as shown in FIG. 4. In a slave mode, the synchronization circuit 42 may operate as discussed above in regard to the embodiment of FIG. 1.

The master/slave circuit 44 may receive a master/slave data signal MS that is indicative of the desired operating mode of the sampling device 40 as a master or a slave, and generate and output a control data signal CTL to the synchronization circuit 42 based on the desired operating mode. If the received master/slave data signal MS indicates that the sampling device 40 should be operated in a slave mode, the control data signal CTL may configure the synchronization circuit 42 to operate as a slave, as discussed above in regard to the embodiment of FIG. 1, and received the desired ODR signal on the single ODR terminal 17.

If the master/slave data signal MS indicates that the sampling device 40 should operate in a master mode, the control signal CTL may configure the synchronization circuit 42 to operate as a master. In some examples, the master/slave data signal MS received by the master/slave circuit 44, which the master/slave circuit may store in a register (not depicted), may include a desired ODR or decimation, and the control data signal CTL may indicate the desired ODR or decimation to the synchronization circuit 42.

In master mode, the synchronization circuit 42 may receive the control data signal CTL indicating the desired ODR, and provide the second clock signal CLK2 and the ratio data RD to the rate setting circuit 16 as described above in regard to FIG. 1. In addition, when operated in master mode, the synchronization circuit 42 may also output the second clock signal CLK2 via the single ODR terminal 17.

The digital phase locked loop circuit may generate the second clock signal CLK2 using the control data signal CTL indicating the desired ODR. As indicated above, when operated in slave mode, the signal ODR terminal 17 may receive the desired ODR signal.

The sampling device 40 also may optionally include a data serializer circuit 46. The data serializer circuit 46 may receive the data output DOUT from the rate setting circuit 16, and provide a serialized data signal DS based on the data output DOUT, and provide a serialized data clock signal SCLK.

In some embodiments, the sampling circuit 12 may be implemented as an analog circuit, while the synchronization circuit 42, rate setting circuit 16, master/slave circuit 44 and data serializer circuit 46 may be implemented as one or more digital circuits.

Returning to FIG. 5, in some embodiments, one or more of the plurality of sampling devices 10 of the sampling system 30 may be similar to the sampling device 40 of FIG. 6, while the remaining sampling devices may be similar to the sampling device 10 according to FIG. 1. In such embodiments, at least one of the sampling devices 10 of FIG. 5 may operate in a master mode to generate the ODR signal on the output data rate terminal 17, and the remaining devices may operate as discussed above in regard to FIG. 1 or in a slave mode to receive a desired ODR signal on the output data rate terminal 17.

Figure 7:
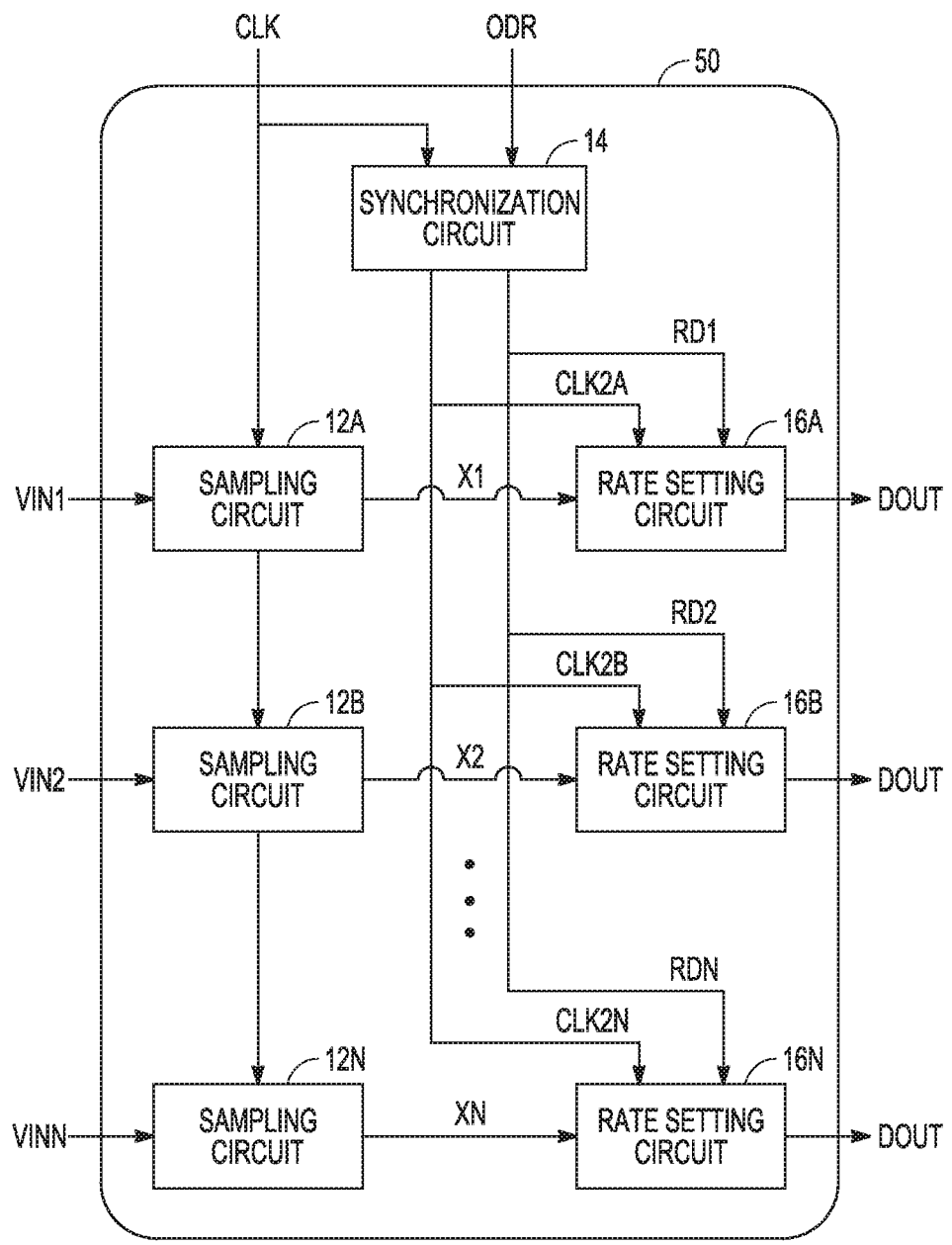
FIG. 7 depicts another embodiment of a sampling device having a plurality of sampling channels.

In some example implementations, an individual sampling device also may include a plurality of sampling channels, as shown in FIG. 7. The techniques of FIG. 7, for example, can allow bandwidth and throughput control for individual channels in a multi-channel device using a single pin interface. For example, using various techniques of this disclosure, integer multiple rate control for other sampling channels can be provided, e.g., output data rate (ODR)/2, (ODR)/4, etc., thereby providing varying ODR for different channels, which can also control the bandwidth of interest. The output bandwidth is often a multiple "X" of the ODR, such as 0.4× ODR, etc. With such a configuration, the signal to noise ratio (SNR) can be improved with a reduction in ODR when lower input frequency tones are being provided in adjacent channels.

FIG. 7 depicts another embodiment of the sampling device having a plurality of sampling channels, with an architecture based on the sampling device 10 of FIG. 1. The sampling device 50 may include a plurality of sampling channels, shown as sampling circuits 12A-12N (collectively referred to as "sampling circuits 12"). In addition, the sampling device 50 may include a plurality of rate setting circuits 16A-16N (collectively referred to as "rate setting circuits 16") and a synchronization circuit 14.

Each of the sampling circuits 12 may be paired with a corresponding rate setting circuit 16. For example, the sampling circuit 12A may be paired with the rate setting circuit 16A, the sampling circuit 12B may be paired with the rate setting circuit 16B, and so forth. Each paired combination of sampling circuit 12 and rate setting circuit 16 may be configured to operate as discussed above in regard to the embodiment of FIG. 1.

The synchronization circuit 14 also may be configured to operate as discussed above in regard to the embodiment of FIG. 1, except that it may provide a respective one of plurality of second clock signals CLK2A-CLK2N and ratio data signals RD1-RDN to each of the rate setting circuits 16. For example, the synchronization circuit 14 can provide the second clock signal CLK2A and ratio data signal RD1 to rate setting circuit 16A, the second clock signal CLK2B and ratio data signal RD2 to rate setting circuit 16B, and so forth.

In some embodiments, the synchronization circuit 14 may customize the second clock signals and ratio data signals for each rate setting circuit 16 to enable the sampling device 50 to provide digital outputs DOUT at a plurality of corresponding different sampling rates. For example, the synchronization circuit 14 may be configured to provide second clock signals and ratio data signals to the plurality of rate setting circuits at a predetermined combination of different multiples of the output data rate.

In other embodiments, the synchronization circuit 14 may provide a same second clock signal and ratio data signal to a first subset or group of rate setting circuits 16 and a different second clock signal and ratio data signal to a second subset or group of rate setting circuits 16 to enable the sampling device to provide digital outputs at a mixture of the same and different sampling rates. In other words, a plurality of second clock signals can include at least first and second groups of second clock signals, where the first group of second clock signals has a different frequency than the second group of second clock signals, where the plurality of data signals includes at least first and second groups of data signals, e.g., ratio data, and where the first group of data signals is different than the second group of data signals.

Figure 8:
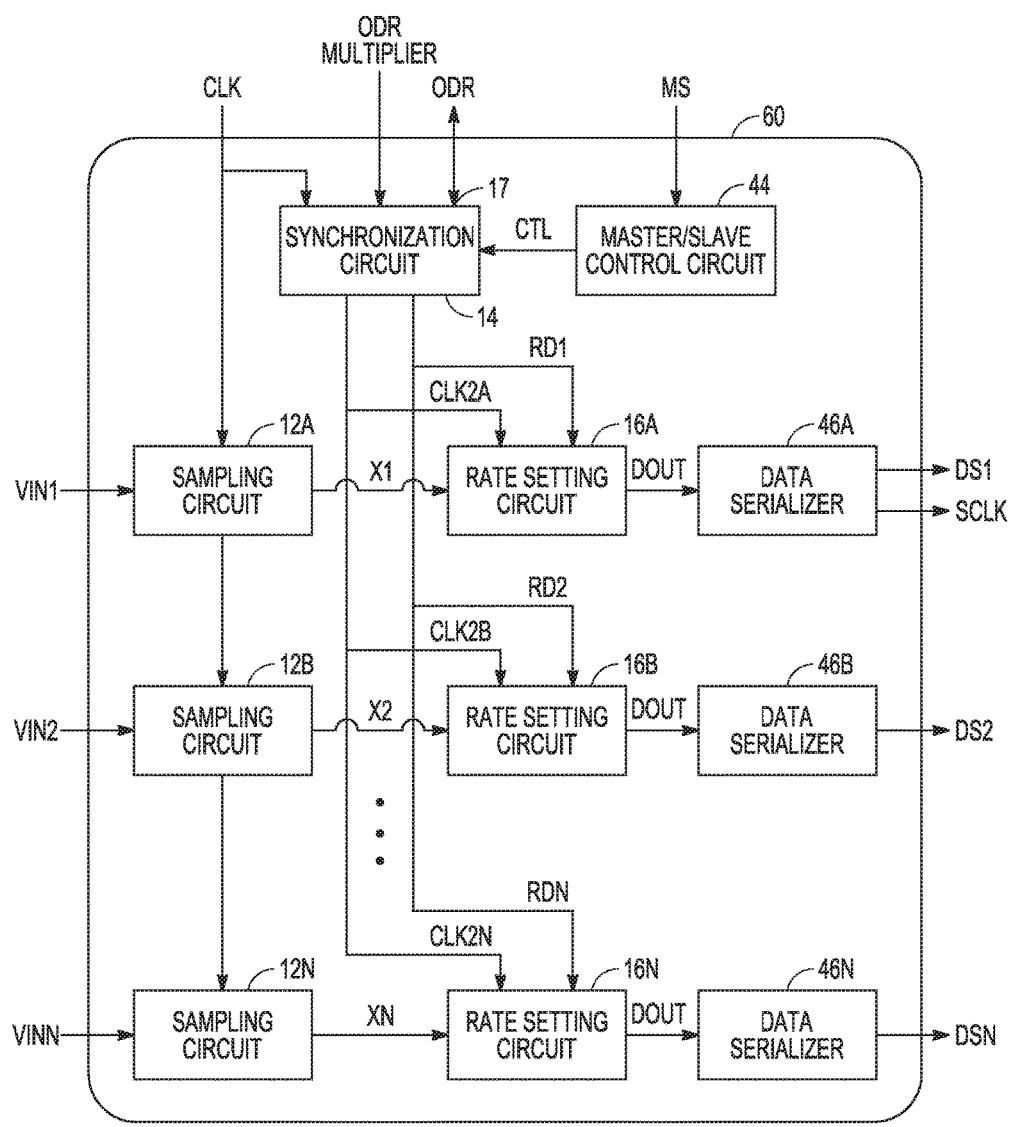
FIG. 8 depicts another embodiment of a sampling device having a plurality of sampling channels.

FIG. 8 depicts another embodiment of a sampling device having a plurality of sampling channels, with an architecture based on the sampling device of FIG. 6. The sampling device 60 may include a plurality of sampling circuits 12A-12N, a plurality of rate setting circuits 16A-16N, a synchronization circuit 14 and a master/slave control circuit 44.

Each of the sampling circuits 12 may be paired with a corresponding rate setting circuit 16. For example, the sampling circuit 12A may be paired with the rate setting circuit 16A, the sampling circuit 12B may be paired with the rate setting circuit 16B, and so forth. Each paired combination of sampling circuit 12 and rate setting circuit 16 may be configured to operate as discussed above in regard to the embodiment of FIG. 6.

The synchronization circuit 14 also may be configured to operate as discussed above in regard to the embodiment of FIG. 6, except that it may provide a respective one of plurality of second clock signals CLK2A-CLK2N and ratio data signals RD1-RDN to each of the rate setting circuits 16. For example, the synchronization circuit 14 can provide the second clock signal CLK2A and ratio data signal RD1 to rate setting circuit 16A, the second clock signal CLK2B and ratio data signal RD2 to rate setting circuit 16B, and so forth.

In some embodiments, the synchronization circuit 14 may customize the second clock signals CLK2A-CLK2N and ratio data signals RD1-RDN for each rate setting circuit 16, to enable the sampling device 60 to provide digital outputs DOUT at a plurality of corresponding different sampling rates. For example, the synchronization circuit 14 can receive an ODR multiplier signal that can providing varying ODR for different channels, which can also control the bandwidth of interest. The ODR multiplier signal can allow integer multiple rate control for other sampling channels, e.g., output data rate (ODR)/2, (ODR)/4, etc. As mentioned above, the master/slave control data signal CTL may indicate either master or slave mode.

In other embodiments, the synchronization circuit 14 may provide a same second clock signal and ratio data signal to a first subset or group of rate setting circuit 16 and different second clock signal and ratio data signal to a second subset or group of rate setting circuit 16 to enable the sampling device to provide digital outputs at a mixture of the same and different sampling rates. In other words, a plurality of second clock signals can include at least first and second groups of second clock signals, where the first group of second clock signals has a different frequency than the second group of second clock signals, where the plurality of data signals includes at least first and second groups of data signals, e.g., ratio data, and where the first group of data signals is different than the second group of data signals.

Corresponding methods of operation and non-transitory storage mediums exist. Additional embodiments also exist. Any feature of any of the embodiments described herein can optionally be used in any other embodiment. Also, embodiments may optionally include any subset of the components or features discussed herein.

Various Notes

Aspect 1 includes subject matter (such as a device, system, circuit, apparatus, or machine) for synchronizing a plurality of sampling channels, the subject matter comprising: a single output data rate (ODR) terminal configured to receive a desired ODR signal representing an ODR, a synchronization circuit configured to receive the desired ODR signal and a first clock signal and output a second clock signal synchronized to the ODR signal and output a data signal representing a relationship of the ODR to a frequency of the first clock signal; and at least one of the plurality of sampling channels, the at least one of the plurality of sampling channels including: a sampling circuit configured to receive a respective analog input signal and the first clock signal and output a sampled signal based on the analog input signal at a rate based on the frequency of the first clock signal; and a rate setting circuit configured to receive the data signal and the second clock signal and output a digital signal representative of the respective analog input signal at the output data rate.

In Aspect 2, the subject matter of Aspect 1 can optionally include, wherein the plurality of sampling channels are located in a plurality of sampling devices.

In Aspect 3, the subject matter of Aspect 1 can optionally include, wherein the plurality of sampling devices are located on the same circuit board.

In Aspect 4, the subject matter of one or more of Aspects 1-3 can optionally include, a master/slave control circuit configured to receive a respective master/slave input signal representing a desired operating mode, and generate a control data signal to the synchronization circuit based on the desired operating mode, wherein, in a master mode, the synchronization circuit is configured to output the second clock signal synchronized to the desired ODR signal on the single ODR terminal, and wherein, in a slave mode, the at least one sampling device is configured to receive the desired ODR signal on the single ODR terminal.

In Aspect 5, the subject matter of one or more of Aspects 1-4 can optionally include, a data serializer circuit configured to receive the digital signal output by the rate setting circuit and generate serialized data based on the digital signal and generate a serialized data clock signal.

In Aspect 6, the subject matter of one or more of Aspects 1-5 can optionally include, a plurality of the sampling channels, wherein the synchronization circuit configured to output a second clock signal synchronized to the desired ODR signal and output a data signal representing a relationship of the ODR to the frequency of the first clock signal is configured to: output a plurality of second clock signals synchronized to the desired ODR signal and output a plurality of data signals, each of the plurality of data signals representing a relationship of the ODR to the frequency of the first clock signal; wherein each of the plurality of rate setting circuits is configured to: receive a respective one of the plurality of second clock signals and a respective one of the plurality of data signals, and output a digital signal representative of the respective analog input signal at a respective output data rate.

In Aspect 7, the subject matter of Aspect 6 can optionally include, wherein the plurality of second clock signals includes at least first and second groups of second clock signals, wherein the first group of second clock signals has a different frequency than the second group of second clock signals, wherein the plurality of data signals includes at least first and second groups of data signals, and wherein the first group of data signals is different than the second group of data signals.

In Aspect 8, the subject matter of Aspect 6 can optionally include, wherein the at least one of the plurality of sampling devices includes: a master/slave control circuit configured to receive a respective master/slave input signal representing a desired operating mode, and generate a control data signal to the synchronization circuit based on the desired operating mode, wherein the desired ODR signal includes data representing a multiple of the ODR for each of the plurality of sampling channels, wherein the synchronization circuit configured to output a plurality of second clock signals synchronized to the desired ODR signal and output a plurality of data signals, each of the plurality of data signals representing a relationship of the ODR to the frequency of the first clock signal is configured to: output, based on the control data signal, a plurality of second clock signals synchronized to the desired ODR signal and output a plurality of data signals, each of the plurality of data signals representing a relationship of the ODR to the frequency of the first clock signal.

In Aspect 9, the subject matter of one or more of Aspects 1-8 can optionally include, wherein the synchronization circuit includes: a digital phase locked loop circuit configured to receive the desired ODR signal and output the second clock signal; and a data calculation circuit configured to receive the first clock signal and output the data signal.

In Aspect 10, the subject matter of one or more of Aspects 1-9 can optionally include, wherein the sampling circuit includes: a sigma delta analog to digital converter having a sigma delta modulator circuit and a decimation filter circuit.

In Aspect 11, the subject matter of one or more of Aspects 1-10 can optionally include, wherein the sampling circuit includes: a successive approximation register (SAR) analog to digital converter.

In Aspect 12, the subject matter of one or more of Aspects 1-11 can optionally include, wherein the rate setting circuit includes: a decimation circuit including a filter.

In Aspect 13, the subject matter of one or more of Aspects 1-12 can optionally include, wherein the frequency of the first clock signal is higher than a frequency of the second clock signal and a frequency of the ODR.

In Aspect 14, the subject matter of one or more of Aspects 1-13 can optionally include, wherein the data signal representing a relationship of the ODR to a frequency of the first clock signal is a ratio data signal representing a ratio of the ODR to a frequency of the first clock signal.

Aspect 15 includes subject matter (such as a method, means for performing acts, machine readable medium including instructions that when performed by a machine cause the machine to performs acts, or an apparatus configured to perform) for synchronizing a plurality of sampling channels, the subject matter comprising: receiving, via a single output data rate (ODR) terminal, a desired ODR signal representing an ODR; receiving, via a synchronization circuit, the desired ODR signal and a first clock signal; outputting, via the synchronization circuit, a second clock signal synchronized to the ODR signal and outputting a data signal representing a relationship of the ODR to a frequency of the first clock signal; receiving, via a sampling circuit, a respective analog input signal and the first clock signal and outputting a sampled signal based on the analog input signal at a rate based on the frequency of the first clock signal; and receiving, via a rate setting circuit, the data signal and the second clock signal and outputting a digital signal representative of the respective analog input signal at the output data rate.

In Aspect 16, the subject matter of Aspect 15 can optionally include, receiving, via a master/slave control circuit, a respective master/slave input signal representing a desired operating mode, and generating a control data signal based on the desired operating mode, when in a master mode, outputting the second clock signal synchronized to the desired ODR signal on the single ODR terminal, and when in a slave mode, receiving the desired ODR signal on the single ODR terminal.

In Aspect 17, the subject matter of Aspect 16 can optionally include, receiving, via a data serializer circuit, the digital signal output and generating serialized data based on the digital signal and generating a serialized data clock signal.

In Aspect 18, the subject matter of Aspect 15 can optionally include, wherein outputting a second clock signal synchronized to the desired ODR signal and outputting a data signal representing a relationship of the ODR to the frequency of the first clock signal includes: outputting a plurality of second clock signals synchronized to the ODR signal and outputting a plurality of data signals, each of the plurality of data signals representing a relationship of the ODR to the frequency of the first clock signal; receiving, via each of the plurality of rate setting circuits, a respective one of the plurality of second clock signals and a respective one of the plurality of data signals; and outputting a digital signal representative of the respective analog input signal at a respective output data rate.

In Aspect 19, the subject matter of Aspect 18 can optionally include, wherein the plurality of second clock signals includes at least first and second groups of second clock signals, wherein the first group of second clock signals has a different frequency than the second group of second clock signals, wherein the plurality of data signals includes at least first and second groups of data signals, and wherein the first group of data signals is different than the second group of data signals.

In Aspect 20, the subject matter of Aspect 18 can optionally include, receiving, via a master/slave control circuit, a respective master/slave input signal representing the desired operating mode, and generating a control data signal based on the desired operating mode, wherein the desired ODR signal includes data representing a multiple of the desired ODR signal for each of the plurality of sampling channels; wherein outputting a plurality of second clock signals synchronized to the desired ODR signal and outputting a plurality of data signals, each of the plurality of data signals representing a relationship of the ODR to the frequency of the first clock signal includes: outputting, based on the control data signal, a plurality of second clock signals synchronized to the desired ODR signal and outputting a plurality of data signals, each of the plurality of data signals representing a relationship of the ODR to the frequency of the first clock signal.

The above detailed description includes references to the accompanying drawings, which form a part of the detailed description. The drawings show, by way of illustration, specific embodiments in which the invention can be practiced. These embodiments are also referred to herein as "aspects," Such aspects can include elements in addition to those shown or described. However, the present inventors also contemplate examples in which only those elements shown or described are provided. Moreover, the present inventors also contemplate aspects using any combination or permutation of those elements shown or described (or one or more aspects thereof), either with respect to a particular aspect (or one or more aspects thereof), or with respect to other aspects (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system for synchronizing a plurality of sampling channels, the system comprising:
    a single output data rate (ODR) terminal configured to receive a desired ODR signal representing an ODR,
    a synchronization circuit configured to receive the desired ODR signal and a first clock signal and output a second clock signal synchronized to the ODR signal and output a data signal representing a relationship of the ODR to a frequency of the first clock signal; and
    at least one of the plurality of sampling channels, the at least one of the plurality of sampling channels including:
        a sampling circuit configured to receive a respective analog input signal and the first clock signal and output a sampled signal based on the analog input signal at a rate based on the frequency of the first clock signal; and
        a rate setting circuit configured to receive the sampled signal, the data signal, and the second clock signal and output a digital signal representative of the respective analog input signal at the output data rate.

2. The system of claim 1, wherein the plurality of sampling channels are located in a plurality of sampling devices.

3. The system of claim 2, wherein the plurality of sampling devices are located on the same circuit board.

4. The system of claim 1, comprising:
    a master/slave control circuit configured to receive a respective master/slave input signal representing a desired operating mode, and generate a control data signal to the synchronization circuit based on the desired operating mode,
    wherein, in a master mode, the synchronization circuit is configured to output on the single ODR terminal the second clock signal synchronized to the desired ODR signal, and
    wherein, in a slave mode, the at least one sampling device is configured to receive the desired ODR signal on the single ODR terminal.

5. The system of claim 4, comprising:
    a data serializer circuit configured to receive the digital signal output by the rate setting circuit and generate serialized data based on the digital signal and generate a serialized data clock signal.

6. The system of claim 1, comprising:
    a plurality of the sampling channels,
    wherein the synchronization circuit configured to output a second clock signal synchronized to the desired ODR signal and output a data signal representing a relationship of the ODR to the frequency of the first clock signal is configured to:
    output a plurality of second clock signals synchronized to the desired ODR signal and output a plurality of data signals, each of the plurality of data signals representing a relationship of the ODR to the frequency of the first clock signal;
    wherein each of the plurality of rate setting circuits is configured to:
        receive a respective one of the plurality of second clock signals and a respective one of the plurality of data signals, and
        output a digital signal representative of the respective analog input signal at a respective output data rate.

7. The system of claim 6, wherein the plurality of second clock signals includes at least first and second groups of second clock signals, wherein the first group of second clock signals has a different frequency than the second group of second clock signals, wherein the plurality of data signals includes at least first and second groups of data signals, and wherein the first group of data signals is different than the second group of data signals.

8. The system of claim 6, wherein the at least one of the plurality of sampling devices includes:
    a master/slave control circuit configured to receive a respective master/slave input signal representing a desired operating mode, and generate a control data signal to the synchronization circuit based on the desired operating mode,
    wherein the desired ODR signal includes data representing a multiple of the ODR for each of the plurality of sampling channels,
    wherein the synchronization circuit configured to output a plurality of second clock signals synchronized to the desired ODR signal and output a plurality of data signals, each of the plurality of data signals representing a relationship of the ODR to the frequency of the first clock signal is configured to:

output, based on the control data signal, a plurality of second clock signals synchronized to the desired ODR signal and output a plurality of data signals, each of the plurality of data signals representing a relationship of the ODR to the frequency of the first clock signal.

9. The system of claim 1, wherein the synchronization circuit includes:
   a digital phase locked loop circuit configured to receive the desired ODR signal and output the second clock signal; and
   a data calculation circuit configured to receive the first clock signal and output the data signal.

10. The system of claim 1, wherein the sampling circuit includes:
    a sigma delta analog to digital converter having a sigma delta modulator circuit and a decimation filter circuit.

11. The system of claim 1, wherein the sampling circuit includes:
    a successive approximation register (SAR) analog to digital converter.

12. The system of claim 1, wherein the frequency of the first clock signal is higher than a frequency of the second clock signal and a frequency of the ODR.

13. The system of claim 1, wherein the data signal representing a relationship of the ODR to a frequency of the first clock signal is a ratio data signal representing a ratio of the ODR to a frequency of the first clock signal.

14. A system for synchronizing a plurality of sampling channels, the system comprising:
    means for receiving a desired ODR signal representing an ODR;
    means for receiving the desired ODR signal and a first clock signal;
    means for outputting a second clock signal synchronized to the ODR signal and outputting a data signal representing a relationship of the ODR to a frequency of the first clock signal;
    means for receiving a respective analog input signal and the first clock signal and outputting a sampled signal based on the analog input signal at a rate based on the frequency of the first clock signal; and
    means for receiving the sampled signal, the data signal, and the second clock signal and outputting a digital signal representative of the respective analog input signal at the output data rate.

15. A method for synchronizing a plurality of sampling channels, the method comprising:
    receiving, via a single output data rate (ODR) terminal, a desired ODR signal representing an ODR;
    receiving, via a synchronization circuit, the desired ODR signal and a first clock signal;
    outputting, via the synchronization circuit, a second clock signal synchronized to the ODR signal and outputting a data signal representing a relationship of the ODR to a frequency of the first clock signal;
    receiving, via a sampling circuit, a respective analog input signal and the first clock signal and outputting a sampled signal based on the analog input signal at a rate based on the frequency of the first clock signal; and
    receiving, via a rate setting circuit, the sampled signal, the data signal, and the second clock signal and outputting a digital signal representative of the respective analog input signal at the output data rate.

16. The method of claim 15, comprising:
    receiving, via a master/slave control circuit, a respective master/slave input signal representing a desired operating mode, and generating a control data signal based on the desired operating mode,
    when in a master mode, outputting on the single ODR terminal the second clock signal synchronized to the desired ODR signal, and
    when in a slave mode, receiving the desired ODR signal on the single ODR terminal.

17. The method of claim 16, comprising:
    receiving, via a data serializer circuit, the digital signal output and generating serialized data based on the digital signal and generating a serialized data clock signal.

18. The method of claim 15, wherein outputting a second clock signal synchronized to the desired ODR signal and outputting a data signal representing a relationship of the ODR to the frequency of the first clock signal includes:
    outputting a plurality of second clock signals synchronized to the desired ODR signal and outputting a plurality of data signals, each of the plurality of data signals representing a relationship of the ODR to the frequency of the first clock signal;
    receiving, via each of the plurality of rate setting circuits, a respective one of the plurality of second clock signals and a respective one of the plurality of data signals; and
    outputting a digital signal representative of the respective analog input signal at a respective output data rate.

19. The method of claim 18, wherein the plurality of second clock signals includes at least first and second groups of second clock signals, wherein the first group of second clock signals has a different frequency than the second group of second clock signals, wherein the plurality of data signals includes at least first and second groups of data signals, and wherein the first group of data signals is different than the second group of data signals.

20. The method of claim 18, comprising:
    receiving, via a master/slave control circuit, a respective master/slave input signal representing a desired operating mode, and generating a control data signal based on the desired operating mode,
    wherein the desired ODR signal includes data representing a multiple of the desired ODR signal for each of the plurality of sampling channels;
    wherein outputting a plurality of second clock signals synchronized to the desired ODR signal and outputting a plurality of data signals, each of the plurality of data signals representing a relationship of the ODR to the frequency of the first clock signal includes:
    outputting, based on the control data signal, a plurality of second clock signals synchronized to the desired ODR signal and outputting a plurality of data signals, each of the plurality of data signals representing a relationship of the ODR to the frequency of the first clock signal.

* * * * *